United States Patent [19]

Reid

[11] 3,714,126

[45] Jan. 30, 1973

[54] ANTIMONY COMPOUND CATAYZED ETHYLENE GLYCOL POLYESTERIFICATION WITH ADDED SECOND DIOL

[75] Inventor: James Angus Wilson Reid, Runcorn, England

[73] Assignee: Imperial Chemical Industries Limited, London, England

[22] Filed: Sept. 27, 1971

[21] Appl. No.: 184,270

Related U.S. Application Data

[62] Division of Ser. No. 761,289, Sept. 20, 1968, abandoned.

[52] U.S. Cl. .............................. 260/75 R, 260/75 M
[51] Int. Cl. ........................................... C08g 17/015
[58] Field of Search .................................. 260/75 R

[56] References Cited

UNITED STATES PATENTS 3,196,131   7/1965   Mayer et al. ........................... 260/75
3,423,280   1/1969   Wiener ................................... 260/75
3,407,112   11/1968  Karickhoff et al. .................... 260/75

FOREIGN PATENTS OR APPLICATIONS 1,294,370   4/1962   France .................................. 260/75

OTHER PUBLICATIONS

Korshak et al., Polyesters, New York, Pegamon Press 1965 p. 143

*Primary Examiner*—Melvin Goldstein
*Attorney*—Cushman, Darby & Cushman

[57] ABSTRACT

Addition of a diol selected from the group consisting of 1,2-propanediol, 1,3-propanediol, 1,3-butanediol, 2,3-butane-diol, and 1,3-cyclohexanediol to the trivalent antimony compound (e.g. $Sb_2O_3$) catalyzed formation of ethylene glycol polyesters of aromatic acids (e.g., terephthalic) results in products of higher luminace value.

10 Claims, No Drawings

ANTIMONY COMPOUND CATAYZED ETHYLENE GLYCOL POLYESTERIFICATION WITH ADDED SECOND DIOL

This is a division, of application Ser. No. 761,289 filed Sept. 20, 1968 and now abandoned.

This invention relates to a method of improving the color of highly polymeric polyesters of ethylene glycol and aromatic dicarboxylic acids and which have been obtained from polymerization reactions involving the use of antimony-containing polycondensation catalysts.

Highly polymeric polyesters of ethylene glycol and aromatic dicarboxylic acids, by which we mean dicarboxylic acids wherein each —COOH group is attached to a carbon atom which forms part of an aromatic carbocyclic ring, are known to be useful thermoplastic materials. Two which may be mentioned in particular are those from terephthalic acid and 1,2-di(p-carboxyphenoxy)ethane.

Highly polymeric poly(ethylene terephthalate), for example, is a thermoplastic having a very desirable combination of physical and chemical properties and is produced in large tonnages for conversion to filament and fiber, e.g. for textile applications, and to film. More recently, compositions based on it have been nnounced for general thermoplastic molding, e.g. injection-molding applications.

For many applications, and particularly for use in fiber or filament form in textiles, for use in thermoplastic molding applications or for use in films, it is highly desirable that these polyesters be as free from discoloration as possible.

Many processes have been proposed for the production of these polyesters and the processes have involved a variety of starting materials. In general, however, all the processes proceed via the formation of a bis ethylene glycol ester of the aromatic dicarboxylic acid and the polycondensation of this intermediate to highly polymeric polyester with loss of ethylene glycol. The bis glycol ester may be formed, for example, by reaction of the aromatic dicarboxylic acid or of an ester-forming derivative thereof, e.g. a dialkyl ester, with ethylene glycol, or by the reaction of the aromatic dicarboxylic acid with ethylene oxide or with ethylene carbonate.

Both the process of forming the bis glycol ester and the polycondensation thereof to highly polymeric polyester may be facilitated by the action of catalysts and the catalysts for the two stages can be the same or different. In accordance with one preferred method of effecting the polycondensation, however, catalysis is provided by antimony in the trivalent state. In this method, the catalysis may be effected, for example, by the addition of a compound of trivalent antimony, generally antimony trioxide, or by the use of a substance which under the conditions of the polycondensation reaction provides antimony in the trivalent state.

For convenience, such polycondensations involving catalysis by antimony in the trivalent state are referred to hereinafter as trivalent antimony catalysed polycondensations.

These trivalent antimony catalysed polycondensations, and particularly those involving the use of antimony trioxide, tend to produce polyester discolored by a greyish tinge thought to be due to residual antimony metal. We have now found a method of reducing this discoloration.

In accordance with our invention, the method comprises effecting at least the final stages of a trivalent antimony catalysed polycondensation of at least one bis ethylene glycol ester of an aromatic dicarboxylic acid in the presence of from 0.01 to 15 mole percent, based on the molar concentration of bis ethylene glycol ester, of a diol having the structure

where $R_1$ and $R_2$ are each selected from the group consisting of hydrogen atoms and monovalent hydrocarbon groups wherein the free valency is attached to a non-aromatic carbon atom or $R_1$ and $R_2$ together form a divalent hydrocarbon group, $R_3$ is hydrogen or a monovalent hydrocarbon group, $n$ is 1 or 2, and no more than one of $R_1$ and $R_2$ is hydrogen when $n$ is 1.

To achieve maximum advantage from our invention, the diol is profitably added to the reaction mixture before polycondensation has commenced; the advantage gained from adding it at any later stage before completion of the polycondensation being likely to be reduced in conformity with the delay in adding it.

Conveniently, the diol may be added to the polycondensation mixture before or together with the antimony catalyst.

In a particularly convenient embodiment of the invention, the diol may be added at the commencement of, or during, the reaction for producing the bis ethylene glycol ester. In effecting the invention in accordance with this embodiment, it will be recognized that at least part of the diol may react with the acid or derivative thereof and it will be appreciated that when this embodiment of the process is used, at least some of the diol may be present in the trivalent antimony-catalysed polycondensation process as one or more reaction products thereof.

Where the diol is added before or during the reaction for producing the bis ethylene glycol ester, its concentration may suitably be calculated on the basis of the total amount of aromatic dicarboxylic acid present either as such or in the form of one or more ester forming derivatives thereof. Thus, for example, where the acid is used in the form of its dialkyl, e.g. dimethyl ester, the concentration of the diol is conveniently calculated on the basis of the molar concentration of dialkyl ester. Where the diol is added after formation of the bis ethylene glycol ester, e.g. at the beginning of our during the polycondensation reaction, its concentration may be calculated on the molar amount of bis ethylene glycol ester.

The invention may be adapted for use in batch or continuous reactions. Thus, for example, in a batch reaction, the diol may be added during the reaction to form the bis ethylene glycol ester and/or at the beginning or at some stage during the polycondensation reaction. In a continuous polycondensation, if the diol has not already been added before or during the reaction to form the bis ethylene glycol ester, it may be added to the polycondensation mixture at or before commencement of the continuous reaction. Alternatively, it may be added at a suitable point along the reaction path. Where two or more reaction vessels are used, the diol may conveniently be added, for example, at the point of transfer from one reaction vessel to the next.

It is not essential that all the diol be added at once. For example, where appropriate it may be added continuously or in portions during either or both of the reaction to form the bis ethylene glycol ester and the polycondensation reaction, although little or no extra benefit is normally likely to be gained from this.

With the use of diol concentrations much below 0.01 mole percent of bis ethylene glycol ester (or aromatic dicarboxylic acid), little noticeable improvement in color may be obtained and, in general, in order to take account of volatilization losses which may occur, it is generally preferred to use at least several times this amount, e.g. at least 0.3 to 0.5 mole percent. On the other hand, any further improvement in color, if any, obtained by exceeding a concentration of 15 mole percent is likely to be offset by a significant deterioration in other properties, e.g. crystallinity, strength and softening point. Moreover, the yellowness of the polymer also tends to be reduced if the concentration of the diol is low, e.g. below about 11 mole percent, and for the best combination of color and physical properties we prefer to use concentrations of from 2 to 8 mole percent. However, the optimum amount will not necessarily be the same for each diol, for example because of differences in volatility which will result in differing amounts being lost during the reaction. The optimum amount for any particular diol may be established by simple experiment.

The preferred diols for use in our invention are those wherein (a) $n$ is 1, $R_1$ is a monovalent hydrocarbon group containing not more than six or at most eight carbon atoms and $R_2$ is either hydrogen or a monovalent hydrocarbon group containing not more than six or at most eight carbon atoms, and (b) n is 2 and each of $R_1$, $R_2$ and $R_3$ is a hydrogen atom or a monovalent hydrocarbon group containing not more than 6 or at most 8 carbon atoms, or $R_1$ and $R_2$ together form a divalent hydrocarbon group having a chain of from 1 to 3 carbon atoms joining the hydroxy bearing carbon atoms and not more than five carbon atoms in all.

Preferably in (a) and (b) $R_1$ and $R_2$ are each methyl or ethyl or $R_1$ and $R_2$ together form a group having the structure $(CH_2)_m$ where $m$ is 1, 2 or 3, and $R_3$ is methyl or ethyl.

Particularly preferred examples are propane-1,2-diol, butane-2,3-diol, propane-1,3-diol, butane-1,3-diol and cyclohexane-1,3-diol. Of these, butane-1,3-diol is especially preferred. Butane-2,3-diol, although generally somewhat less efficient than the 1,3-isomer may have the additional advantage of improving the light transmission of the polymer formed by the process. This property is particularly advantageous in film applications.

Examples of other diols that may be used are octane-1,2-diol, pentane-2,3-diol, 2-n-hexyl-propane-1,3-diol, 1-benzylethylene glycol. 4-methylpentane-1,2-diol, 3-methylbutane-1,2-diol and hexane-1,2-diol. Mixtures of the diols may be used if desired.

Our invention is especially applicable to polymerizations involving the use of antimony trioxide as the polycondensation catalyst. However, it may also be used in processes for forming polyesters of ethylene glycol and aromatic dicarboxylic acids where the polycondensation stage is catalysed by other trivalent antimony-containing catalysts which tend to leave residues of antimony metal in the polymeric product.

So as not to lose the advantages of the desireable properties of the polyesters of ethylene glycol and aromatic dicarboxylic acids it is usually preferred that apart from the diol specified for color improvement, the polymerizable material consists only of ethylene glycol (or equivalent, e.g. ethylene oxide or ethylene carbonate) and aromatic dicarboxylic acid (or equivalent, e.g. dialkyl ester). However, the presence of a small concentration of other polycondensable material may be tolerated, if desired, for example to improve dyeability. For example, up to about 5 mole percent of the ethylene glycol (or equivalent) may be replaced by at least one other polycondensable dihydroxy compound (or equivalent) and/or up to about 5 mole percent of the dicarboxylic acid (or equivalent) may be replaced by at least one another dicarboxylic acid (or equivalent) which may be aromatic or aliphatic in nature. The mixture may also contain up to about 5 mole percent of other mono- or polyfunctional material, e.g. alcohols, amines, amino-alcohols, aminoacids, hydroxyacids, lactams, lactones and diamines. However, it is usually preferred that at least 85 mole percent, and preferably at least 95 mole percent, of the polycondensable mixture, excluding the specified diol for color improvement, consist of ethylene glycol (or equivalent) and the desired aromatic dicarboxylic acid (or equivalent).

Other additives may include, for example, heat and light stabilizers for the polyester product. In particular, we have found that a still greater improvement in color may be obtained from the presence in the polycondensation reaction of phosphates, e.g. triphenyl phosphate, since then polymeric products remarkable for their clean white color may be obtained. Other phosphorus-containing stabilizers may also be used, e.g. phosphites and phosphorous acid.

The highly polymeric polyesters obtained by the process of our invention have less of a grey color than those produced by similar processes involving polymerization using trivalent antimony containing catalysts but in the absence of our specified diol, and corresponding improvements may be gained in fibers, films or molded articles obtained from the polymers.

The reduction in greyness may be measured by reference to the luminance of the polymer, which is a measure of the proportion of the incident light reflected on examination of the polymer using a "-Colormaster" which is the trade name for the differential colorimeter manufactured by Manufacturers Engineering and Equipment Corporation. The luminance may be measured on the as made polymer or on articles fabricated therefrom.

In the case of poly(ethylene terephthalate) in particular, relatively small variations in luminance can be of considerable importance in deciding the value of a particular polymer for commercial purposes, e.g. for conversion to film, fiber and molded articles. It is thus highly desirable, particularly for filament end uses, that the polymer should have a high degree of luminance. However, luminance values depend to a considerable degree upon the history of formation of the polymer and comparisons of results found in the Examples are only meaningful where the polymers in question were prepared under identical conditions, on the same scale, in the same equipment, and using the same catalysts and additives.

Another factor that is relevant to the commercial viability of polyesters is their yellowness. Yellowness, as recorded in the Examples, is a measure based on C.I.E. (Conference International d'Eclairage) chromaticity co-ordinate, of the separation of the point representing the color rating of the polymer from the point representing standard illuminant 'C', positive values being measured in the direction of a dominant wavelength of 580—590 $\mu$ and negative values in the direction of a dominant wavelength of 470—490 $\mu$. It is also measured on a "Colormaster" instrument.

The preferred poly(ethylene terephthalate) polyesters have a high value for luminance and a low value for yellowness.

Our invention is now illustrated by the following Examples in which all parts are expressed as parts by weight.

EXAMPLE 1

The polymerization apparatus comprised a suitably heated glass polymerization vessel having a vacuum offtake, a nitrogen inlet, a stirrer, provision for charging the reacting materials and provision for removing volatile by-products. A. The vessel was flushed with nitrogen to remove all traces of air and then charged under an atmosphere of nitrogen with 103.3 parts of dimethyl terephthalate, 80.4 parts of ethylene glycol, and 0.037 part of manganese acetate ($Mn(OOC.CH_3)_2$ as a transesterification catalyst. The mixture was heated to 200°C and maintained at this temperature until distillation of the methanol stopped. The time taken was approximately 2 hours. 0.061 Part of antimony trioxide was then added and the temperature of the mixture was raised to 280°C and maintained there for 1 hour. Pressure within the vessel was then reduced to 0.5 mm of mercury absolute, and heating was continued for a further 3 hours at 280°C. The vessel was then cooled and the polymeric reaction product recovered. It was a definite grey color.

B. The process was then repeated except that the charge of ethylene glycol was reduced to 79.2 parts and 2.0 parts (approximately 5 mole percent based on dimethyl terephthalate) of propane-1,2-diol were also added with the ethylene glycol. The polymeric reaction product showed no sign of greyness and had a creamy color.

EXAMPLE 2

A. The process described in Example 1A was repeated with the modification that 0.052 part of triphenyl phosphate was added with the antimony trioxide. The polymeric reaction product was grey.

B. The polymerization was then repeated but with the ethylene glycol charge reduced to 79.2 parts and 2.0 parts of propane-1,2-diol charged with the ethylene glycol. The polymeric reaction product, which had an intrinsic viscosity of 0.6, measured on a solution of 1.0 gm. of the polymer in 100 ml. of o-chlorophenol at 25°C, was white.

Injection mouldings of the polymer of process B were also considerably lighter in color than those of the polymer of process A.

EXAMPLE 3

The process of Example 2B was repeated with the modification that the charge of ethylene glycol was increased to 80.1 parts and the charge of propane-1,2-diol was reduced to 1.0 part. The polymeric reaction product, which had an intrinsic viscosity of 0.59 measured as described in Example 2, was less grey than the polymer of Example 2A but not as good in color as the polymer of Example 2B.

EXAMPLE 4

The process of Example 2B was repeated with the modification that the ethylene glycol charge was reduced to 78.4 parts and the propane-1,-2diol charge was increased to 3.0 parts. The polymeric product was clear white in color.

EXAMPLE 5

The process of Example 2B was repeated with the modification that the propane-1,2-diol was replaced by 2.34 parts (4.9 mole percent based on dimethyl terephthalate) of butane-2,3-diol and that the amount of antimony oxide used was reduced to 0.046 part. The polymeric product was much lighter in color than the polymer of Example 2A but not as white as that of Example 2B.

2 Parts of the polymer were dissolved in 100 parts of hexafluoroisopropanol and the light transmission of a sample of the solution was compared with that of a corresponding solution obtained from the polymer obtained from the process of Example 2A. The percentage transmission of the former was greater than 96 (compared with about 90 for the latter) over the range 400—600 $\mu$.

Good quality highly transparent films could be melt extruded from the polymer.

EXAMPLE 6

The process of Example 4 was repeated with the modification that the propane-1,2-diol was replaced by 3.6 parts of butane-2,3-diol (7.5 mole percent based on dimethyl terephthalate) and that the amount of antimony oxide used was reduced to 0.046 part. The polymeric product was white.

EXAMPLE 7

The process of Example 2A was repeated except that the charge of ethylene glycol was reduced to 79.2 parts and 2.0 parts (5 mole percent based on dimethyl terephthalate) of propane-1,3-diol were also added with the ethylene glycol. The polymeric reaction product, which had an intrinsic viscosity of 0.59 measured on a solution of 1 gm. of polymer in 100 ml. of o-chlorophenol at 25°C, was a clean white color and showed no sign of greyness.

EXAMPLE 8

The process of Example 2A was repeated except that, after the transesterification, 0.5 part (1.25 mole percent based on dimethyl terephthalate) of propane-1,3-diol was added with the 0.061 part of antimony trioxide and 0.052 part of triphenyl phosphate. The polymeric reaction product, which had an intrinsic viscosity of 0.64 measured on a solution of 1 gm. of polymer in 100 ml. of o-chlorophenol at 25°C, was a white color.

EXAMPLE 9

The process of Example 7 was repeated except that the charge of ethylene glycol was reduced to 76 parts and 7.6 parts (12.3 mole percent based on dimethyl terephthalate) of cyclohexane-1,3-diol were also added with the ethylene glycol. The polymeric reaction product, which had an intrinsic viscosity of 0.51 measured on a solution of 1 gm. of polymer in 100 ml. of o-chlorophenol at 25°C, was a clean white color and showed no sign of greyness.

EXAMPLE 10

The process of Example 7 was repeated except that the charge of ethylene glycol was reduced to 78.8 parts and 1.2 parts (2.1 mole percent based on dimethyl terephthalate) of cyclohexane-1,3-diol were also added with the ethylene glycol. The polymeric reaction product, which had an intrinsic viscosity of 0.58 measured on a solution of 1 gm. of polymer in 100 ml. of o-chlorophenol at 25°C, was a clean white color and showed no sign of greyness.

EXAMPLE 11

The process of Example 7 was repeated except that the charge of ethylene glycol was reduced to 79.6 parts and 0.5 part (1.25 mole percent based on dimethyl terephthalate) of butane-1,3-diol was also added with the ethylene glycol. The polymeric reaction product, which had an intrinsic viscosity of 0.72 measured on a solution of 1 gm. of polymer in 100 ml. of o-chlorophenol at 25°C, was a clean white color and showed no sign of greyness.

EXAMPLE 12

The process of Example 7 was repeated except that the charge of ethylene glycol was reduced to 78.8 parts and 1 part of butane-1,3-diol was also added with the ethylene glycol. The polymeric reaction product, which had an intrinsic viscosity of 0.64 measured on a solution of 1 gm. of polymer in 100 ml. of o-chlorophenol at 25°C, was a clean white color and showed no sign of greyness.

EXAMPLE 13

The process of Example 2A was repeated except that after the transesterification, 2.0 parts of butane-1,3-diol were added with the 0.061 part of antimony trioxide, and 0.015 part of phosphorous acid was used in place of the triphenyl phosphite. The polymeric reaction product, which had an intrinsic viscosity of 0.50, measured on a solution of 1 gm. of polymer in 100 ml. of o-chlorophenol at 25°C, was a white color.

EXAMPLE 14

The process of Example 1A was repeated except that the charge of ethylene glycol was reduced to 79.2 parts and 2.0 parts of propane-1,3-diol was also added with the ethylene glycol. The polymeric reaction product was a creamy white color and showed no sign of greyness.

EXAMPLES 15—20

A series of experiments were effected using the apparatus and process of Example 2 and varying only the nature and concentration of the added diol. The products were crystallized by exposing then to 120°C for 30 minutes and their luminance was then measured and recorded in the Table below.

| Example | Diol (and concentration)[1] | Luminance |
| --- | --- | --- |
| Control |  | <56 |
| 15 | Propane-1,2-diol (4.4) | 59 |
| 16 | Propane-1,2-diol (6.6) | 63 |
| 17 | Propane-1,3-diol (4.4) | 60 |
| 18 | Butane-2,3-diol (4.4) | 68 |
| 19 | Butane-2,3-diol (6.6) | 69 |
| 20 | Butane-2,3-diol (11.0) | 70 |

[1] mole % based on dimethyl terephthalate.

EXAMPLES 21 AND 22

1,552 Parts of dimethyl terephthalate and 1,200 parts of ethylene glycol were added cold to a glass vessel which had been previously purged with nitrogen. The vessel was provided with heating means, a stirrer, an offtake for volatile material and a nitrogen inlet and outlet. The mixture was then melted at 120° to 130°C under nitrogen and an amount of manganous acetate tetrahydrate equivalent to 0.388 part of anhydrous manganous acetate was added. The temperature of the mixture was them gradually raised to about 200° to 220°C while methanol was driven off. When the theoretical amount of methanol had been collected, 7.76 parts of $TiO_2$ were added together with 0.233 part of phosphorous acid ($H_3PO_3$) and 0.93 part of antimony trioxide.

The whole was then transferred under an atmosphere of nitrogen to a stainless steel polymerization vessel fitted with a stirrer, nitrogen inlet and outlet and offtake for volatile materials. The temperature was raised to 230°C and then the pressure was gradually reduced to about 1 mm of mercury absolute over a period of 30 minutes while the temperature was slowly raised to 290°C. These conditions were maintained for about 2 hours and then the molten polymer was extruded from the vessel and granulated.

The process was then repeated in each of two further experiments but with the modification that a measured quantity of propane-1,2-diol was added after the theoretical amount of methanol had been collected but before the mixture was transferred to the polymerization vessel.

The luminance and yellowness of fibers spun from each of the polymers so obtained were then measured and the results are tabulated below.

| Example | Diol (and concentration)[1] | Luminance | Yellowness |
| --- | --- | --- | --- |
| Control | — | 74 | 23 |
| 21 | Propane-1,2-diol (2.56) | 78 | −1 |
| 22 | Propane-1,2-diol (12.8) | 81 | 19 | mole % based on dimethyl terephthalate.

EXAMPLE 23

The process of Examples 21 and 22 was repeated in two further experiments in one of which no diol was added and in the other of which butane-2,3-diol was used in an amount of 6.5 mole percent, based on dimethyl terephthalate. Fibers were spun from each of the polymers so produced and the luminance and yellowness of the fibers were measured and recorded below.

Control: Luminance 74; Yellowness 5.
With butane-2,3-diol: Luminance 78; Yellowness 0.

EXAMPLES 24—26

100 Parts of dimethyl terephthalate and 71 parts of ethylene glycol were added cold to a stirred stainless steel ester-interchange vessel which had been purged with nitrogen. The mixture was raised to 140°C and an amount of manganous acetate tetrahydrate equivalent to 0.025 part of anhydrous manganous acetate was added. Gentle heating was then applied and the temperature was gradually raised to 220°C, and the methanol distilled off. When the theoretical amount of methanol had been collected, 0.015 part of phosphorous acid was added and the mixture was transferred under oxygen-free conditions to a stirred polymerization autoclave. 0.06 Part of antimony trioxide and 0.5 part of titanium dioxide were then added and the temperature raised to 235°C. Pressure was then reduced to 1 mm of mercury absolute while the temperature was raised to 290°C. The temperature was then maintained at 290°C until the desired melt viscosity had been achieved, and the polymer then extruded and granulated.

A series of further experiments were carried out following the above procedure exactly but in each of which a specified quantity of a butane diol or propane diol was added with the antimony trioxide.

The polymers obtained from each experiment were then heat treated to gain maximum crystallinity and their softening points were measured.

Yarn was spun from each of the polymers so obtained and the luminance of the spun yarn was measured.

The readings obtained for the softening points of the polymers and the luminance of the yarns are recorded below.

| Example | Diol and concentration[1] | Polymerization cycle time[2] | Softening point °C | Luminance |
|---|---|---|---|---|
| 24 | Butane-2,3-diol (4.3) | 132 min. | 263.3 | 74 |
| 25 | propane-1,2-diol (5.1) | 140 min. | 261.5 | 78 |
| 26 | butane-1,3-diol (4.3) | 146 min. | 262.3 | 80 |
| Control | — | 123 min. | 262.8 | 71 |

[1] Mole % based on dimethyl terephthalate.
[2] Time from the attainment of a pressure of 1 mm of mercury absolute to turning off the agitator.

EXAMPLES 27 TO 29

Control. Using the apparatus and process described for Examples 21 and 22, 1,552 parts of dimethyl terephthalate were reacted with 1,200 parts of ethylene glycol in the presence of manganous acetate tetrahydrate (an amount equivalent to 0.388 parts of anhydrous manganous acetate). The molten product so obtained was then transferred to a stainless steel polymerization vessel fitted with a stirrer, nitrogen inlet and outlet, and offtake for volatile materials. 1.33 Parts of antimony trioxide, 1.21 parts of triphenyl phosphate and 7.68 parts of finely divided talc (80 percent by weight below 2 microns) were added, and polycondensation was effected as described in Examples 21 and 22. The polymeric product was then extruded from he polymerization vessel into a bath containing water, and the extrudate dried in an oven at 35°C and a pressure of 15 mm of mercury absolute overnight. The dried product was then chipped, dried again at 140°C for 4 hours and then injection moulded using a mould heated to 140°C and a residue time in the mould of 40 seconds to give tensile test bars.

The process was then repeated in each of three further experiments but with the modification that in each case 3 mole percent (based on dimethyl terephthalate) of a specified diol was added with the ethylene glycol. In the first experiment (Example 27) the diol was propane-1,2-diol, in the next (Example 28) it was propane-1,3-diol, and in the last (Example 29) it was butane-2,3-diol.

The notched impact strengths and tensile properties of the test pieces obtained in these experiments were similar to those of the test pieces from the control experiment but their color was much less grey.

EXAMPLES 30 TO 33

Control. The polymerization of the above control experiment was repeated but without the talc, with the amount of antimony trioxide reduced to 0.79 part and with the amount of triphenyl phosphate increased to 2.18 parts. A greyish polymer was obtained.

The process was then repeated in each of four further experiments but with the modification that in each case a specified quantity of a color-improving diol was added with the ethylene glycol, as follows:

Example 30: 2 mole percent (based on dimethyl terephthalate) of propane-1,2-diol.
Example 31: 3 mole percent (based on dimethyl terephthalate) of butane-2,3-diol.
Example 32: 3 mole percent (based on dimethyl terephthalate) of propane-1,3-diol.
Example 33: 1 mole percent (based on dimethyl terephthalate) of butane-1,3-diol.

The polymers of Examples 30 to 34 were all less grey than that of the control and clear, transparent films could be obtained from all of the polymers by melt extrusion.

COMPARATIVE EXAMPLE

The process of Example 3 was repeated but with the modification that the propane-1,2-diol was replaced by 1.3 parts of phenyl ethylene glycol. The product showed no improvement in greyness compared with that obtained by the process of Example 2A.

Negative results were also obtained when the phenyl ethylene glycol was replaced by:
tetramethyl ethylene glycol,
2,2-dimethylpropane-1,3-diol,
2-methylpentane-2,3-diol,
3-methylpentane-2,3-diol,
2-methylpentane-2,4-diol,
2,2,4,4-tetramethylcyclobutane-1,3-diol, and
2,2-diethylpropane-1,3-diol.

In some cases, the greyness was, if anything more intense.

What we claim is:

1. In a process for the production of a fiber- or a self-supporting film-forming polyester by the polycondensation of the bis ethylene glycol ester of an aromatic dicarboxylic acid, wherein the aromatic acid is the sole acid component of the ester, using a trivalent antimony catalyst, the improvement which comprises carrying out at least part of the polycondensation in the presence of from 0.01 to 15 mole percent, based on the bis ethylene glycol ester, of a diol or the reaction product of a diol and the aromatic dicarboxylic acid or an ester forming derivative thereof, said diol being selected from the group consisting of propane-1,2-diol, propane-1,3-diol, butane-1,3-diol, butane-2,3-diol and cyclohexane-1,3-diol to obtain a fiber- or film-forming polyester which is characterized by a higher luminance value than obtainable in the absence of said diol but under otherwise identical conditions.

2. A process as claimed in claim 1 in which the diol is propane-1,2-diol or butane-2,3-diol.

3. A process as claimed in claim 1 in which the diol is propane-1,3-diol or butane-1,3-diol.

4. A process as claimed in claim 1 in which the diol is cyclohexane-1,3-diol.

5. A process as claimed in claim 1 in which the diol is used in an amount of from 0.5 to 11 mole percent.

6. A process as claimed in claim 1 in which the diol is used in an amount of from 2 to 8 mole percent.

7. A process as claimed in claim 1 in which the aromatic dicarboxylic acid is terephthalic acid.

8. A process as claimed in claim 1 in which the diol is present throughout the polycondensation, said diol being added to the reaction mixture before the polycondensation begins.

9. In a process for the production of a fiber- or self-supporting film-forming polyester which includes the steps of (1) producing the bis ethylene glycol ester of terephthalic acid by reaction of a dialkyl ester of an aromatic dicarboxylic acid with ethylene glycol as the sole essential reactants, then (2) polycondensing the bis ethylene glycol ester using a trivalent antimony catalyst, the improvement which comprises adding at the commencement of or during step (1), from 0.01 to 15 mole percent of a diol selected from propane-1,2-diol, propane-1,3-diol, butane-1,3-diol, butane-2,3-diol and cyclohexane-1,3-diol whereby a fiber- or self-supporting film-forming polyester is obtained which is characterized by a higher luminance value than obtainable in the absence of said diol but under otherwise identical conditions.

10. A process according to claim 9 in which the diol is used in an amount from 2 to 8 mole percent.

* * * * *